US012607875B2

(12) United States Patent
Bradley et al.

(10) Patent No.: US 12,607,875 B2
(45) Date of Patent: Apr. 21, 2026

(54) CONTACT LENSES AND METHODS RELATING THERETO

(71) Applicant: CooperVision International Limited, Fareham (GB)

(72) Inventors: Arthur Bradley, Bloomington, IN (US); Martin Webber, Southampton (GB); Paul Chamberlain, Livermore, CA (US); Baskar Arumugam, Dublin, CA (US); David S. Hammond, Pleasanton, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 420 days.

(21) Appl. No.: 18/096,573

(22) Filed: Jan. 13, 2023

(65) Prior Publication Data

US 2023/0229020 A1 Jul. 20, 2023

Related U.S. Application Data

(60) Provisional application No. 63/300,662, filed on Jan. 19, 2022.

(51) Int. Cl.
*G02C 7/04* (2006.01)

(52) U.S. Cl.
CPC ........... *G02C 7/04* (2013.01); *G02C 2202/24* (2013.01)

(58) Field of Classification Search
CPC ...... G02C 7/04; G02C 2202/24; G02C 7/044; G02C 7/021; G02C 7/022; G02C 7/049;
(Continued)

(56) References Cited

U.S. PATENT DOCUMENTS 5,541,678 A * 7/1996 Awanohara ........... G02C 7/044
425/808
6,007,201 A 12/1999 Wada et al.
(Continued)

FOREIGN PATENT DOCUMENTS

CN 104808353 A 7/2015
GB 2613068 A 5/2023
(Continued)

OTHER PUBLICATIONS

International Search Report and Written Opinion issued in corresponding International Patent Application No. PCT/GB2023/050062 mailed Apr. 11, 2023 (16 pages).
(Continued)

*Primary Examiner* — Matthew Y Lee
(74) *Attorney, Agent, or Firm* — Kilyk & Bowersox, P.L.L.C.

(57) ABSTRACT

A contact lens (201) includes an optic zone (202) that is centred on an optical axis (219), and a peripheral zone (204) surrounds the optic zone (202). A cross-sectional slice through the optic zone (202) along a meridian comprises a series of successive arcs (203*a*-203*h*) having a radial curvature power profile. The radial curvature power profile increases monotonically with radial distance from the optical axis (219). Light rays from a distant point source passing through the midpoint of each arc converge toward a point (215) on the first optical axis (203*a*-203*h*). For each arc (203*a*-203*h*), light rays from a distant point source pass through that arc (203*a*-203*h*) and converge towards a point (216) that is spaced away from the optical axis by a first distance. Methods of designing and manufacturing such contact lenses (201) are also described.

15 Claims, 15 Drawing Sheets

(58) Field of Classification Search
CPC .... G02C 2202/06; G02C 7/041; G02C 7/042;
G02C 7/06; G02C 7/061; G02C 7/043;
G02B 1/043; A61F 2/1618
See application file for complete search history.

(56) References Cited

U.S. PATENT DOCUMENTS

| | | | | |
|---|---|---|---|---|
| 6,045,578 | A | 4/2000 | Collins et al. | |
| 6,116,735 | A | 9/2000 | Wada | |
| 6,260,966 | B1 * | 7/2001 | Sawano | G02C 7/042 |
| | | | | 351/159.43 |
| 6,457,826 | B1 | 10/2002 | Lett | |
| 8,690,319 | B2 * | 4/2014 | Menezes | G02C 7/044 |
| | | | | 351/159.16 |
| 2002/0063848 | A1 | 5/2002 | Fiala | |
| 2002/0135733 | A1 * | 9/2002 | Portney | G02C 7/068 |
| | | | | 351/159.41 |
| 2005/0062933 | A1 * | 3/2005 | Perel | G02C 7/042 |
| | | | | 351/159.41 |
| 2006/0082729 | A1 | 4/2006 | To et al. | |
| 2007/0296916 | A1 * | 12/2007 | Holden | G02C 7/044 |
| | | | | 351/159.48 |
| 2009/0257026 | A1 * | 10/2009 | Varnas | G02C 7/063 |
| | | | | 351/200 |
| 2009/0323020 | A1 | 12/2009 | Zhao et al. | |
| 2012/0176582 | A1 * | 7/2012 | Back | G02C 7/041 |
| | | | | 351/159.73 |
| 2014/0211147 | A1 | 7/2014 | Wei et al. | |
| 2015/0316788 | A1 * | 11/2015 | Holden | A61F 2/1451 |
| | | | | 351/159.42 |
| 2017/0192251 | A1 | 7/2017 | Lin et al. | |
| 2017/0273778 | A1 | 9/2017 | Zhao | |
| 2018/0275427 | A1 | 9/2018 | Lau et al. | |
| 2019/0227342 | A1 * | 7/2019 | Brennan | G02C 7/044 |
| 2019/0317339 | A1 | 10/2019 | Lin et al. | |
| 2022/0179240 | A1 * | 6/2022 | Lai | G02C 7/041 |
| 2023/0305318 | A1 * | 9/2023 | Esfandiarijahromi | |
| | | | | G02C 7/042 |

FOREIGN PATENT DOCUMENTS

| | | | |
|---|---|---|---|
| GB | 2624763 | A | 5/2024 |
| JP | 2004510200 | A | 4/2004 |
| JP | 2008090103 | A | 4/2008 |
| JP | 2008514318 | A | 5/2008 |
| JP | 2014149527 | A | 8/2014 |
| TW | I584022 | B | 5/2017 |
| WO | 9314434 | A1 | 7/1993 |
| WO | 9731285 | A1 | 8/1997 |
| WO | 2014184399 | A1 | 11/2014 |
| WO | 2023007134 | A1 | 2/2023 |

OTHER PUBLICATIONS

Search and Examination Report issued in corresponding United Kingdom Patent Application No. GB2407072.4 dated Sep. 6, 2024 (9 pages).
PCT Demand filed Nov. 17, 2023 in corresponding International Patent Application No. PCT/GB2023/050062 (17 pages).
Office Action issued in corresponding Taiwan Patent Application No. 112101917 issued Dec. 5, 2023 (with English translation) (25 pages).
PCT Second Written Opinion of the Int'l Preliminary Examining Authority dated Dec. 5, 2023 in corresponding International Patent Application No. PCT/GB2023/050062 (5 pages).
Response to Second Written Opinion filed Feb. 5, 2024 in corresponding International Patent Application No. PCT/GB2023/050062 (9 pages).
International Preliminary Report on Patentability issued in corresponding International Patent Application No. PCT/GB2023/050062 dated Apr. 26, 2024 (11 pages).
Search and Examination Report issued in corresponding United Kingdom Patent Application No. GB2300530.9 dated Jul. 14, 2023 (7 pages).
Search Report issued in corresponding United Kingdom Patent Application No. 2505207.7 issued May 1, 2025 (3 pages).
Office Action issued in corresponding Japanese Patent Application No. 2024-542307 issued Apr. 28, 2025 (6 pages).
Office Action issued in corresponding Australian Patent Application No. 2023208433 issued Jul. 8, 2025 (3 pages).
Office Action issued in corresponding Taiwan Patent Application No. 113150354 issued Nov. 10, 2025 (10 pages).

* cited by examiner

501

503 — Modelling a contact lens

505 — Within the model, dividing the cross-sectional slice through the optic zone into a series of successive arcs 507 — Within the model, tilting each arc in the series of succesive arcs about the midpoint of that arc.

CONTACT LENSES AND METHODS RELATING THERETO

This application claims the benefit under 35 U.S.C. § 119(e) of prior U.S. Provisional Patent Application No. 63/300,662, filed Jan. 19, 2022, which is incorporated in its entirety by reference herein.

TECHNICAL FIELD

The present invention relates to contact lenses. The present invention relates especially, but not exclusively, to contact lenses for slowing the progression of myopia. The present invention also relates especially, but not exclusively, to contact lenses for use by presbyopes. The present invention also relates to methods of manufacturing such lenses and methods of designing such lenses.

BACKGROUND

Many people, including children and adults require contact lenses to correct for myopia (short-sightedness) and many adults may require lenses to correct for presbyopia (an age-related inability to accommodate and hence inability to focus on near objects).

Myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

Presbyopic eyes do not change shape effectively to accommodate for near objects, and therefore people with presbyopia cannot focus on near objects. Conventional lenses (e.g., spectacle lenses and contact lenses) for correcting presbyopia include bifocal or progressive lenses, which include regions that are optimised for near vision and regions that are optimised for distance vision. Presbyopia may also be treated using bifocal or multifocal lenses, or monovision lenses (wherein different prescription are provided for each eye, one eye being provided with a distance vision lens, and one eye being provided with a near vision lens).

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach to correct for myopia is to provide lenses having both one or more regions that provide full correction of distance vision and one or more regions that under-correct, or deliberately induce, myopic defocus. It has been suggested that this approach can prevent or slow down the development or progression of myopia in children or young people, whilst providing good distance vision.

In the case of lenses having regions that provide defocus, the regions that provide full-correction of distance vision are usually referred to as base power regions and the regions that provide under-correction or deliberately induce myopic defocus are usually referred to as myopic defocus regions or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens).

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

For treating myopia, it is recognised that it may be beneficial to provide a lens that introduces additional myopic defocus. For treating presbyopia, it may be beneficial to provide a lens that gives rise to an extended depth of focus. The present disclosure seeks to provide an improved lens that introduces additional myopic defocus, and benefits from the improved image quality enabled by off-axis imaging techniques as described above.

SUMMARY

According to a first aspect, the present disclosure provides a contact lens including an optic zone centred on an optical axis, and a peripheral zone surrounding the optic zone. A cross-sectional slice through the optic zone taken along a meridian comprises a series of successive arcs having a radial curvature power profile that increases monotonically with radial distance from the optical axis. Light rays from a distant point source passing through the midpoint of each arc converge towards a point on the first optical axis. For each arc, light rays passing through that arc converge towards a point that is a first distance from the optical axis.

According to a second aspect, the present disclosure provides a method of manufacturing a lens. The method comprises forming the lens of the first aspect of the invention.

According to a third aspect, the present disclosure provides a method of designing a contact lens. The method comprises modelling a contact lens includes an optic zone centred on an optical axis, and a peripheral zone surrounding the optic zone. A cross-sectional slice through the optic zone taken along a meridian has a radial curvature power profile that increases monotonically with radial distance from the optical axis. The method comprises, within the model, dividing the cross-sectional slice through the optic zone into a series of successive arcs extending radially outwardly from a central arc that is centred on the optical axis. The method comprises, within the model, tilting each arc in the series of successive arcs about the midpoint of that arc, such that light rays from a distant point source passing through the midpoint of each arc converge towards a point on the first optical axis. For each arc, light rays passing through that arc converge towards a point that is a first distance from the optical axis. The method comprises designing a lens based on the modelled lens.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE FIGURES

Embodiments of the present invention will now be described by way of example only with reference to the accompanying schematic drawings of which.

DETAILED DESCRIPTION

Figure 1A:
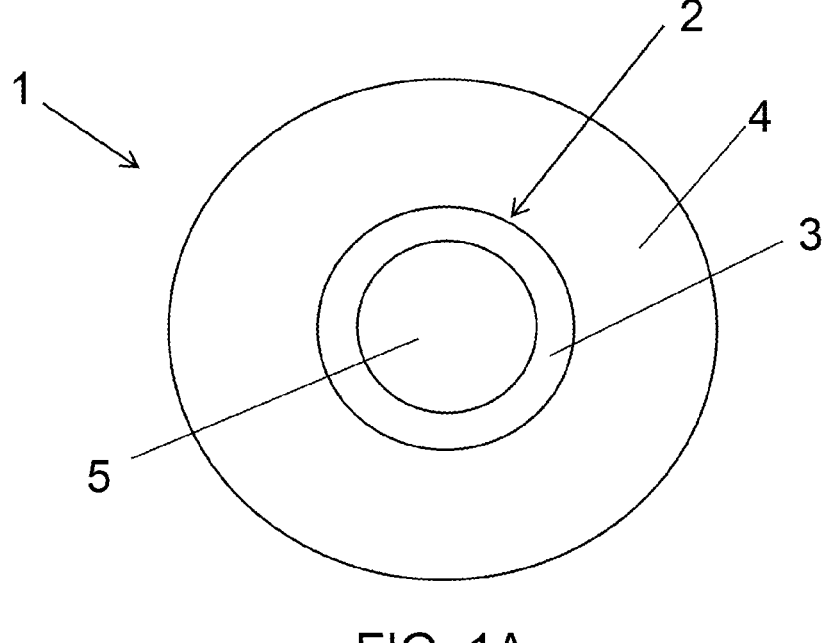
FIG. 1A is a top view of a contact lens that uses a treatment zone that provides a myopically defocused image to reduce the progression of myopia.

According to a first aspect, the present disclosure provides a contact lens. The lens includes an optic one centred on an optical axis, and a peripheral zone surrounding the optic axis. A cross-sectional slice through the optic zone taken along a meridian comprises a series of successive arcs having a radial curvature power profile that increases monotonically with radial distance from the optical axis. Light rays from a distant point source passing through the midpoint of each arc converge towards a point on the first optical axis. For each arc, light rays passing through that arc converge towards a point that is a first distance from the optical axis.

As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). The contact lens may be a soft contact lens, such as a hydrogel contact lens or a silicone hydrogel contact lens. The lens may be a lens for use in preventing or slowing the development or progression of myopia the lens may be for use in providing an extended depth of focus to a myopic eye.

A contact lens according to the present disclosure comprises an optic zone. The optic zone encompasses the parts of the lens that have optical functionality. The optic zone is configured to be positioned over the pupil of an eye when in use. The optic zone is centred on an optical axis. The optical axis may lie along the centreline of the lens. In addition to the series of successive arcs extending radially outwardly from the optical axis, along any meridian, a central arc having a constant radial curvature power may be centred on the optical axis. Alternatively, two central arc portions having a constant radial curvature power may extend in opposing directions outwardly from the optical axis. The lens may include a central region centred on the optical axis, and a central arc or central arc portions may lie along a diameter of the central region. A central region of the lens, spanned by a central arc or by central arc portions, may focus light from a distant point object, on the first optical axis, to a spot on the first optical axis at a distal focal surface. The term surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina, therefore the eye does not focus light onto a flat mathematical plane. However, in the art, the curved surface of the retina is commonly referred to as a plane.

In the context of the present disclosure, a series of arcs refers to arcs that are joined end to end, such that they are arranged in series. In the context of the present disclosure, the arcs represent a 2D slice taken along a meridian of the 3D lens. There may be a transitional section linking each arc. Each arc in a series of arcs may be tilted relative to the central arc about a point halfway along its length. For a series of arcs, the curvature of the arcs increases monotonically with increasing distance from the optical axis, such that, when considering the lens in 3D the radial curvature of the lens increases monotonically with increasing radial distance from the optical axis.

Considering all of the arcs, light rays from a distant point source passing through the midpoint of each arc converges to a point on the first optical axis. The point coincides with the spot formed by light focused along the optical axis.

Considering a single arc along a given meridian, light rays from a distant point source passing through that single arc do not converge to a point on the first optical axis. Light rays passing through a single arc will converge to a point (the focal point for that arc) that is a first distance from the optical axis. The first distance is a non-zero distance. This is a result of the relative tilting of the arcs, about a point halfway along their length. The distance from the optical axis will be dependent upon the radial distance of the arc from the centre of the lens or from the optical axis. For arcs that are close to the centre of the lens, the point at which light rays passing through that arc converge will be closer, in a radial direction, to the optical axis than for arcs that are further from the centre of the lens. Light rays passing through a single arc will converge to a point that is in front of the distal focal plane (i.e., closer to the lens).

The lens may have a central region centred on the optical axis that is spanned by a central arc. A central region may be substantially circular in shape and may for example have diameter of between about 2 and 9 mm, and preferably may be between 2 and 7 mm. A central region may be substantially elliptical in shape.

The optic zone may be surrounded by a peripheral zone. The peripheral zone is not part of the optic zone, but sits outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens.

A contact lens according to an embodiment of the disclosure may include a ballast to orient the lens when positioned on the eye of a wearer. Embodiments of the disclosure incorporating a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye. It may be that the contact lens of the present disclosure provides particular benefit to the wearer in a given orientation. For example, the contact lens may provide particular benefit to the wearer when a maximum add power meridian is in a particular orientation.

The contact lens may be substantially circular in shape and have a diameter from about 4 mm to about 20 mm. The optic zone may be substantially circular in shape and may have a diameter from about 2 mm to about 10 mm. In some embodiments, the contact lens has a diameter from 13 mm to 15 mm, and the optic zone has a diameter from 7 mm to 9 mm.

In the context of the present disclosure, the power of the lens at any point in the optic zone can be defined as radial curvature power, a circumferential curvature power, an average curvature power (which is the average of the radial and circumferential curvature powers), a radial sagittal power, a circumferential sagittal power, and an average sagittal power, (which is the average of the radial and circumferential sagittal powers).

The curvature and sagittal powers are defined as follows:

For a wavefront W, at a point a radial distance r (pupil radius) from a line normal to the centre of the wavefront, $W(r)=A*r^2$, where A is a function.

The wavefront curvature or curvature power, $P_c$, is a function of the second derivative of the wavefront. The wavefront slope, or slope-based power $P_S$, is a function of the first derivative of the wavefront and varies with the slope of the wavefront.

For a simple spherical lens, the curvature power, $P_c$, is defined as:

$$P_C = \frac{\partial^2 W}{\partial r^2} = \frac{\partial(2Ar)}{\partial r} = 2A$$

The slope-based power $P_S$ is defined as $$P_S = \frac{1}{r}\frac{\partial W}{\partial r} = \frac{2Ar}{r} = 2A$$

i.e., $P_C = P_S$ for a simple lens (with paraxial assumptions).

The radial curvature power is the curvature power in a direction extending radially outward from centre of curvature of the lens. The circumferential curvature power is the curvature power at a constant radial coordinate, extending around the circumference of the lens.

The radial sagittal power is the sagittal power in a direction extending radially outward from the centre of the lens. The circumferential sagittal power is the sagittal power at a constant radial coordinate, extending around the circumference of the lens.

Each arc in the series of successive arcs will have a radial curvature (i.e., a curvature along its length) that is proportional to the radial curvature power of the lens along that arc. The optic zone may have a curvature power that results from the curvature of anterior surface or a posterior surface of the lens. The curvature of each arc may be a curvature of an anterior surface of the lens, or a curvature of a posterior surface of the lens. The radial curvature power of the lens along each arc may result from a combination a curvature of the posterior surface of the lens and a curvature of the anterior surface of the lens.

For lenses according to embodiments of the present disclosure, the radial curvature power will increase monotonically extending radially outwards from the centre of the lens along a meridian. This increase in radial curvature power extending radially outwardly from the centre of the lens may increase spherical aberration.

The increase in radial curvature power may be a continuous increase, or may increase in a stepwise or discontinuous manner. Successive arcs along a given meridian may therefore have increasing radial curvature powers extending outwardly from the centre of the lens, such that arcs closer to the centre of the lens have a smaller radial curvature power and arcs further from the centre of the lens may have a greater radial curvature power.

Each arc in a successive series of arcs may be tilted along a point halfway along its length, such that the radial sagittal power of that arc is reduced, but the radial curvature power of that arc is unchanged. As a result of the local tilting of each arc within the series of arcs, the focal point of light passing through a given arc will be shifted away from the optic axis.

Each arc in the series of arcs may have a constant radial curvature within the arc. The radial curvature power along the length of each arc may therefore be constant.

There may be a central arc along any meridian, which is centred on the optical axis, and which may have a constant radial curvature and a constant radial curvature power. Alternatively, there may be two central arc portions along any meridian, extending in opposing directions radially outwardly from the optical axis. The radial curvature power of a central arc or central arc portions along any meridian may provide the base power of the lens. The base power may be between +0.5 D and −15.0 D, preferably between about −0.25 D and −15.0 D.

Any or all of the arcs in the series of arcs along a given meridian may have a constant radial curvature along the length of the arc. Moving outwardly from the centre of the lens, the radial curvature, and radial curvature power of successive arcs will increase. There may be a stepwise increase in radial curvature at the joint between each successive arc. There may be a transitional region between successive arcs. The transition region may give rise to a continuous or discontinuous increase in the radial curvature power at each joint between successive arcs.

The radial curvature power provided by each arc along a meridian may provide an add-power. The add-power may be between +0.5 D and +20.0 D, preferably between +0.5 D and +10.0 D. The net power along an arc will be the sum of the base power and the add-power. Arcs that are closer to the centre of the lens may provide a smaller add-power, and arcs that are further from the centre of the lens may provide a greater add-power.

Each arc in the series of arcs may have a curvature within the arc that increases with radial distance from the centre of the lens.

The radial curvature along the length of each arc may not be constant, but may increase with increasing radial distance from the centre of the lens. The radial curvature power along the length of any given arc may therefore increase with increasing radial distance from the central arc. This may give rise to a continuous increase in radial curvature power extending radially outwards along any given meridian. The increase in radial curvature power extending outwardly from the optical axis may be a linear increase in radial curvature power. A central arc centred on the optical axis, or two opposing central arc portions extending radially outwards from the optical axis along any given meridian may have a constant radial curvature, which may provide the base power. Other arcs in the series of arcs extending radially outwards from a central arc or central arc portions may have a curvature that increases with increasing radial distance from the centre of the lens. A central region of the lens (which may be spanned by a central arc or central arc portions) may therefore have a constant power, and the remainder of the optic region may have an add-power than increases extending radially outwards from a central region.

Along a meridian, the series of successive arcs may comprise a symmetric series of arcs centred on the optical axis. The series of arcs along a meridian may comprise at least 6 arcs extending radially outwardly from the optical axis. The series of arcs along a meridian may comprise at least 10 arcs extending radially outwardly from the optical axis. The series of successive arcs along a meridian may comprise at least 3 arcs extending radially outwards either side of the optical axis. The series of successive arcs along a meridian may comprise at least 5 arcs extending radially outwards either side of the optical axis. Each arc in a series of successive arcs may have the same length. Alternatively, the arcs in a series of arcs may have different lengths.

All cross-sectional slices taken along all meridians of the optical zone may have substantially the same curvature profile. The circumferential curvature power, and optionally, the circumferential sagittal power of a central region of the lens spanned by the central arcs may therefore be constant at a fixed radial distance from the centre of the lens. A central arc along each meridian may have a constant radial curvature power. The curvature power across the central region may be spanned by a central arc along each meridian, and may be constant.

Along each meridian, the radial curvature power profile may be the same, in which case, the circumferential curvature power around the lens will be constant for a fixed radial distance from the centre of the lens. Alternatively, along different meridians, the radial curvature power profile may vary, as the number and length of the arcs may change, and/or the curvature of the arcs may change. In this case, the circumferential curvature power profile around the optic zone may vary with meridian around the lens. The circumferential curvature power around the optic zone may vary in a periodic or aperiodic manner. The circumferential curvature power may oscillate between a maximum and minimum value. The circumferential curvature power profile may oscillate with a sinusoidal, sawtooth or stepwise profile.

Considering the 3D lens formed from summing the 2D cross-sectional slices along each meridian, the series of arcs may sum to form a series of concentric annular regions extending outwardly from a central region. If each series of arcs has substantially the same radial curvature profile, the arcs may form circular concentric annular regions extending outwardly from the centre of the lens. If the arcs along each meridian are the same length, each concentric annular region may have the same width. The series of arcs along each meridian may have different radial curvature power profiles. This may result in concentric annular regions that extend partially around the circumference of the lens, or annular regions that are oval or elliptical in shape.

A cross-sectional slice taken along any meridian of the optical zone may have substantially the same sagittal power profile. Along a given meridian, each arc in the successive series of arcs may be tilted about a point midway along its length, giving rise to a radial sagittal power profile along the series of arcs. Along each meridian, the radial sagittal power profile may be the same, in which case the circumferential sagittal power around the lens will be constant. Alternatively, along different meridians, the radial sagittal power profile may vary, as arcs within each series of arcs may be tilted by different amounts, or the number and length of the arcs may change. In this case, the circumferential sagittal power profile around the optic zone may vary with meridian around the lens. The circumferential sagittal power around the optic zone may vary in a periodic or aperiodic manner. The circumferential sagittal power may oscillate between a maximum and minimum value. The circumferential sagittal power profile may oscillate with a sinusoidal, sawtooth or stepwise profile.

The contact lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

Alternatively, the lens may comprise, consist essentially of, or consist of a silicone elastomer material. For example, the lens may comprise, consist essentially of, or consist of a silicone elastomer material having a Shore A hardness from 3 to 50. The shore A hardness can be determined using conventional methods, as understood by persons of ordinary skill in the art (for example, using a method DIN 53505). Other silicone elastomer materials can be obtained from NuSil Technology or Dow Chemical Company, for example.

According to a second aspect, the present disclosure provides a method of manufacturing a contact lens. The method may comprise forming a contact lens, wherein the contact lens includes an optic zone centred on an optical axis, and a peripheral zone surrounding the optic zone. A cross-sectional slice through the optic zone taken along a meridian comprises a series of successive arcs extending radially outwards from the optical axis. Light from a distant point source passing through the midpoint of each arc converges towards a point on the first optical axis. For each arc, light rays from a distant point source passing through that arc converge towards a point that is a first distance from the optical axis.

The lens may include any of the features set out above in respect of the first aspect of the present disclosure.

The method of manufacturing may comprise forming a female mold member with a concave lens forming surface and a male mold member with a convex lens forming surface. The method may comprise filling a gap between the female and male mold members with bulk lens material. The method may further comprise curing the bulk lens material to forms the lens.

The contact lens may be a formed using a lathing process. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

According to a third aspect, the present disclosure provides a method of designing a contact lens. The method comprises modelling a contact lens. The lens includes an optic zone centred on an optical axis, and a peripheral zone surrounding the optic zone. A cross-sectional slice through the optic zone taken along a meridian has a radial curvature power profile that increases with radial distance from the optical axis. The method comprises, within the model, dividing the cross-sectional slice through the optic zone into a series of successive arcs extending radially outwardly from a central arc that is centred on the optical axis. The method comprises, within the model, tilting each arc in the series of successive arcs about the midpoint of that arc, such that light rays from a distant point source passing through the midpoint of each arc converge towards a point on the first optical axis, and wherein, for each arc, light rays passing through that arc converge towards a point that is a first distance from the optical axis. The method comprises designing a lens based on the modelled lens.

The lens may be designed using modelling, which may be computer-implemented modelling. The designed lens may include any of the features described above.

Figure 1B:
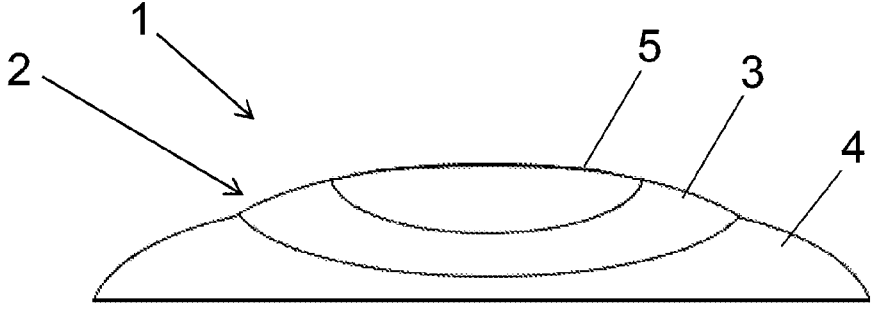
FIG. 1B is a side view of the contact lens of FIG. 1A.
Figures 2A, 2B, 2C:
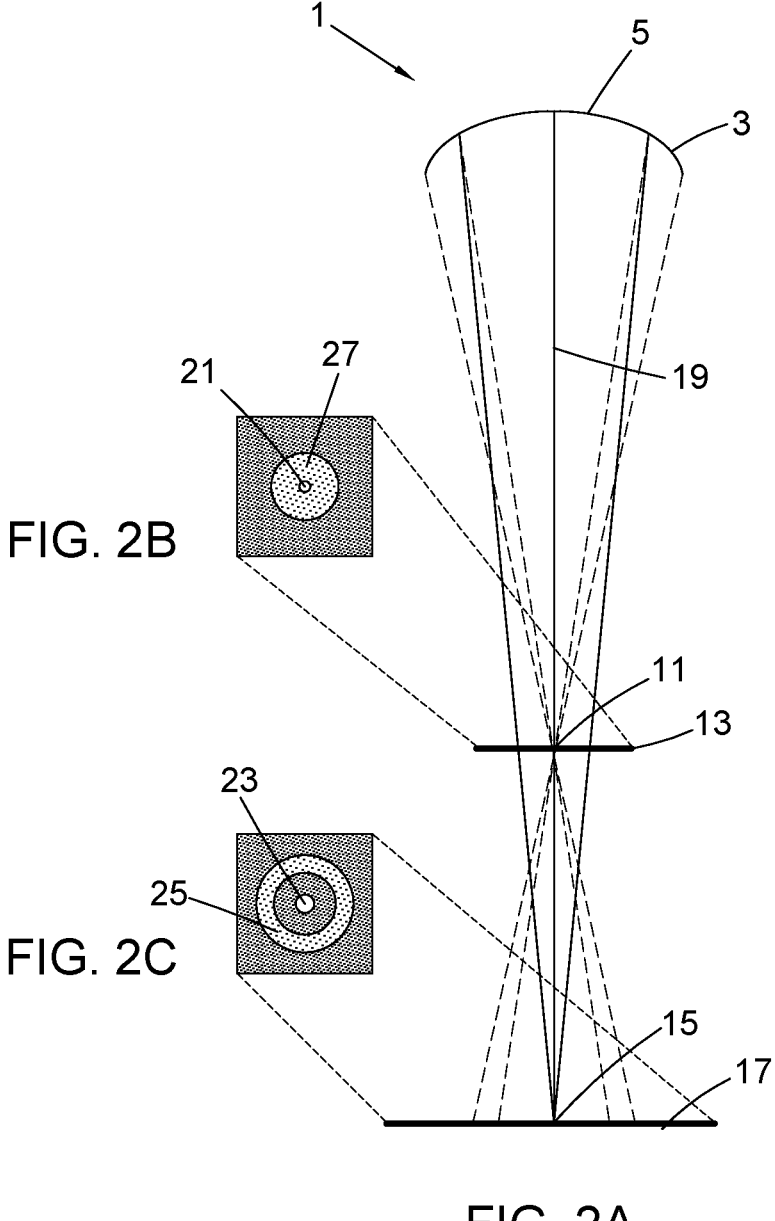
FIG. 2A is a ray diagram for the lens of FIG. 1A.
FIG. 2B shows a light pattern at a proximal focal surface of the lens of FIG. 1A formed from a distant point source.
FIG. 2C shows a light pattern at a distal focal surface of the lens of FIG. 1A formed from a distant point source.
Figure 3:
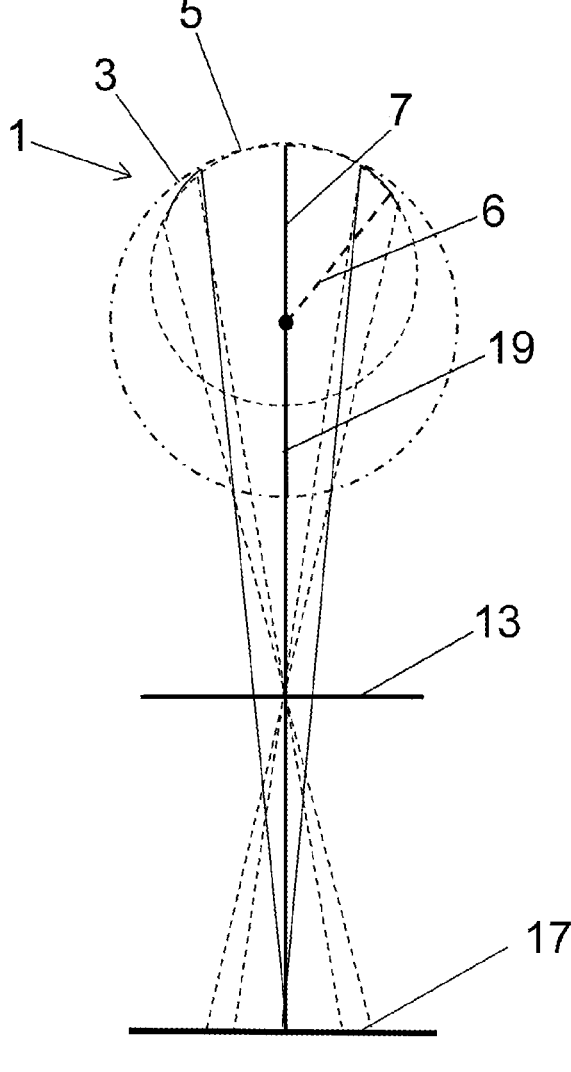
FIG. 3 is a partial ray diagram for the lens of FIGS. 1A and 1B together with circles indicating the radii of curvature of the central distance region (dashed-dotted line) and the annular add region (dashed line) of the contact lens.

FIG. 1A shows a schematic top view of a contact lens 1 that uses a treatment zone that provides a myopically defocused image to reduce the progression of myopia. FIG. 1B shows a schematic side view of the contact lens 1 of FIG. 1A. The lens 1 comprises an optic zone 2, which approximately covers the pupil, and a peripheral zone 4 that sits over the iris. The peripheral zone 4 provides mechanical functions, including increasing the size of the lens thereby making the lens 1 easier to handle, providing ballasting to prevent rotation of the lens 1, and providing a shaped region that improves comfort for the lens 1 wearer. The optic zone 2 provides the optical functionality of the lens 1, and the optic zone 2 comprises an annular region 3 and a central region 5. The lens 1 has a base radial curvature power, which is equal to the base radial sagittal power. The base power results from a radius of curvature of a surface of the lens 1. The centre of curvature of the central region 5 lies on a first optical axis 19 (shown in FIG. 2A). The annular region 3 has a greater radial curvature power than the base radial curvature power. The annular region 3 radial curvature power is provided by a radius of curvature 6 of the annular region 3, which is smaller than the radius of curvature 7 of the central region 5, as shown in FIG. 3. The centre of curvature of the annular region 3 lies on the first optical axis 19. The annular region 3 has a greater power than the central region 5. As shown in FIG. 2A, the focus 11 of the annular region 3 and the focus 15 of the central region 5 share a common optical axis 19. The focus 11 of the annular region 3 lies on a proximal focal surface 13, and the focus for the central region 5 lies on a distal focal surface 17, which is further away from the posterior surface of the lens. As shown in FIG. 2C, for a point source at infinity, light rays focused by the central region 5 form a focused image 23 at the distal focal surface 17. Light rays focused by the central region 5 also produce an unfocused blur spot 27 at the proximal focal surface 13.

As shown in FIG. 2B, light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17. As discussed above, the unfocused annulus image 25 may result in wearers of the lens 1 seeing a 'halo' around focused distance images.

Figure 4A:
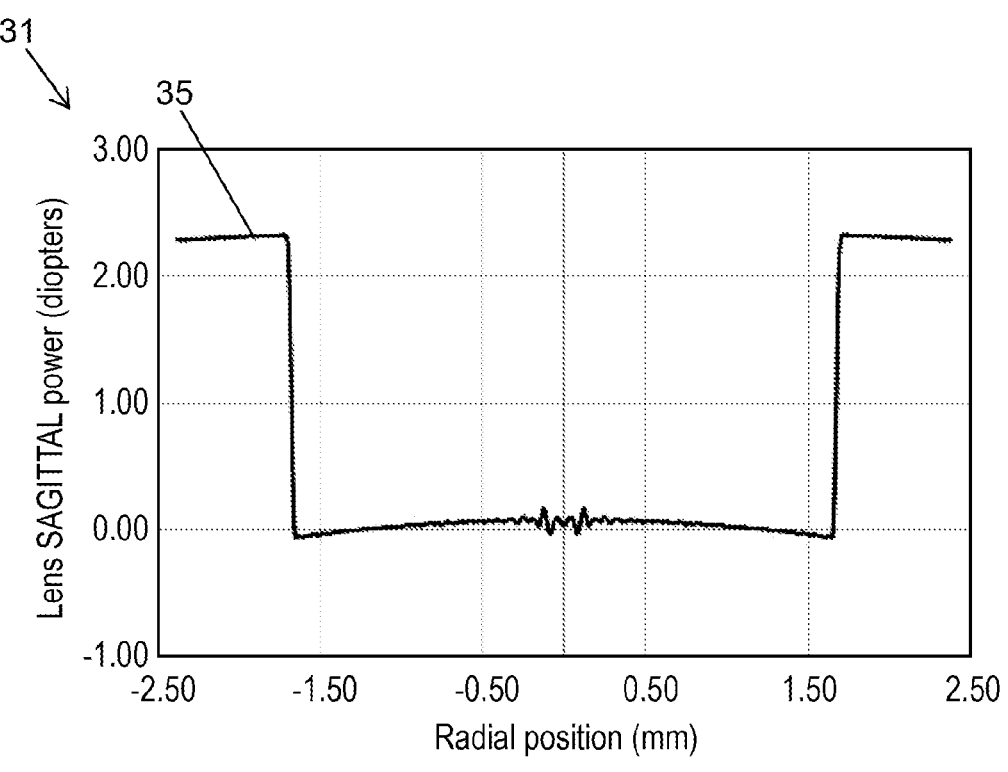
FIG. 4A is a plot showing the variation in radial sagittal power for the lens shown in FIGS. 1A and 1B.
Figure 4B:
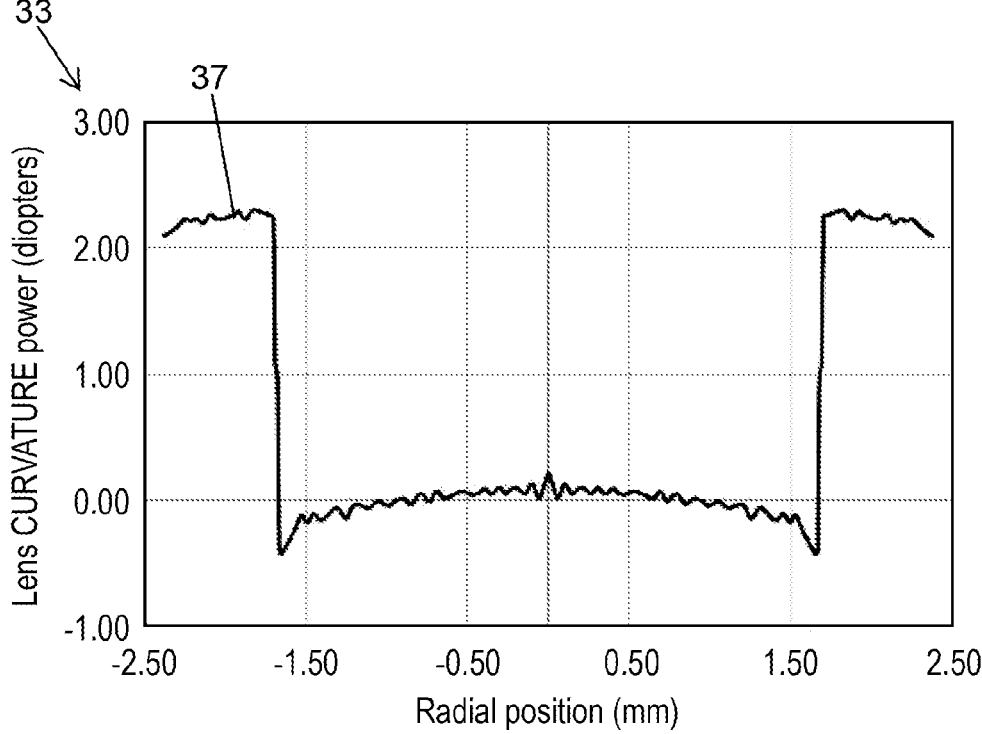
FIG. 4B is a plot showing the variation in radial curvature power for the lens shown in FIGS. 1A and 1B.

FIG. 4A is a plot 31 showing the variation in radial sagittal power for the lens 1 shown in FIGS. 1A and 1B, and FIG. 4B is a plot 33 showing the variation in radial curvature power for the lens shown in FIGS. 1A and 1B. FIGS. 4A and 4B show power variations along a radial diameter of the lens 1. For this lens 1, as the annular region 3 has a greater power than the central region 5, and as the annular region 3 has an on-axis centre of curvature, the radial sagittal power (indicated by curve 35) is greater across the annular region 3 than across the central region 5. The radial curvature power (indicated by curve 37) is also greater across the annular region 3 than across the central region 5.

Figure 5A:
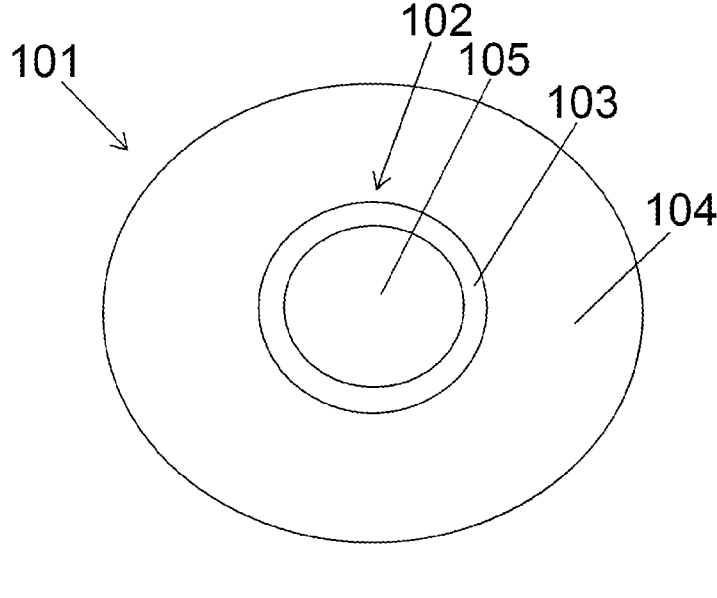
FIG. 5A is a top view of a different contact lens having non-coaxial optics.
Figure 5B:
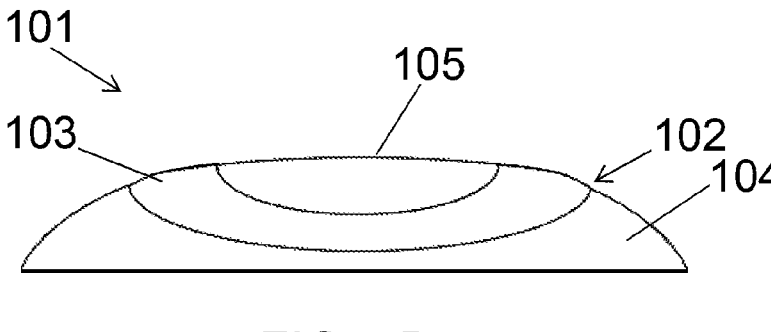
FIG. 5B is a side view of the contact lens of FIG. 5A.
Figures 6A, 6B, 6C:
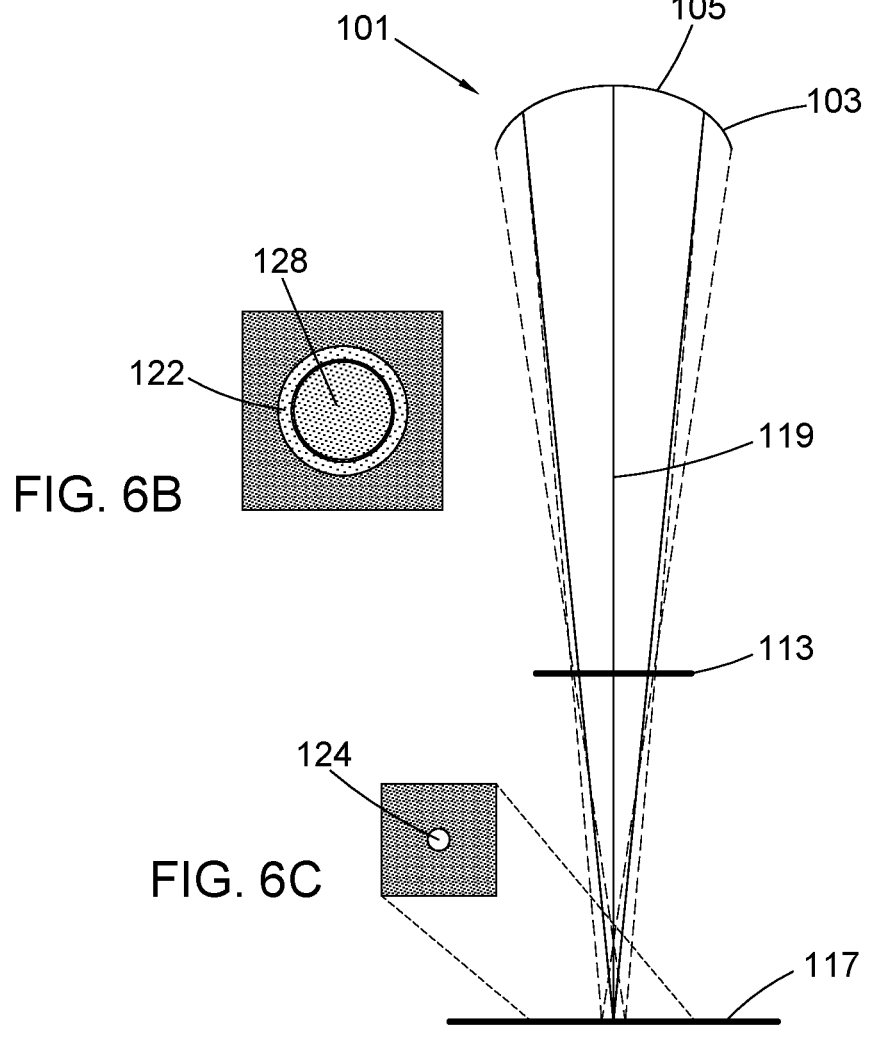
FIG. 6A is a ray diagram for the lens of FIGS. 5A and 5B.
FIG. 6B shows a light pattern at a proximal focal surface of the lens of FIGS. 5A and 5B formed from a distant point source.
FIG. 6C shows a light pattern at a distal focal surface of the lens of FIGS. 5A and 5B formed from a distant point source.
Figure 6D:
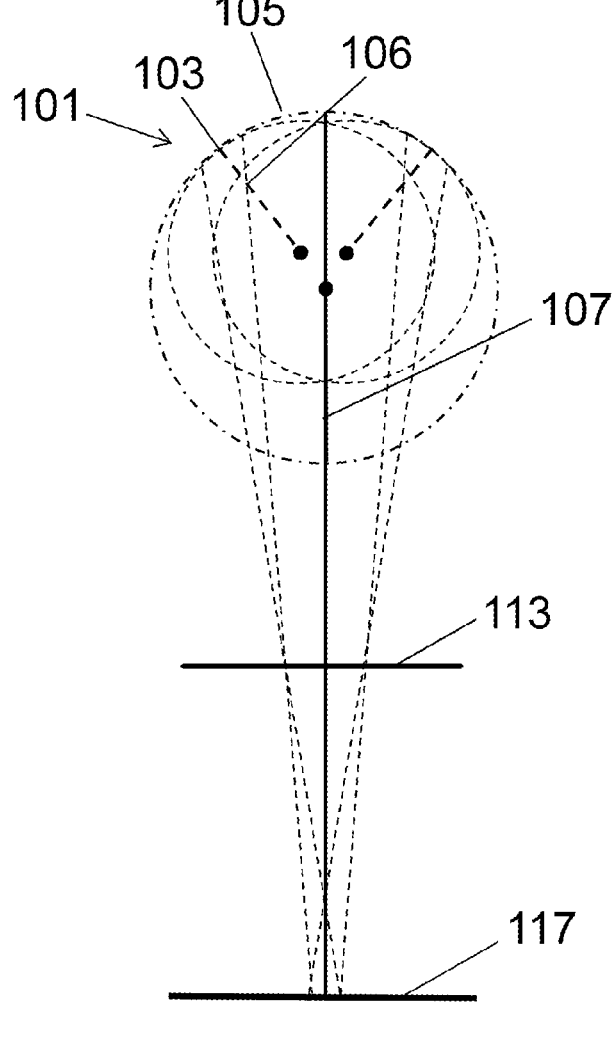
FIG. 6D is a partial ray diagram for the lens of FIGS. 5A and 5B together with circles indicating the radii of curvature of the central distance region (dashed-dotted line) and the annular add region (dashed line) of the contact lens.

FIG. 5A shows a schematic top view of contact lens 101 having non-coaxial optics for reducing the progression of myopia. This lens 101 has a treatment with an off-axis centre of curvature, and does not form an on-axis image at a proximal focal surface. FIG. 5B shows a schematic side view of the lens of FIG. 5A. Similarly, to the lens 1 of FIGS. 1A and 1B, the lens 101 comprises an optic zone 102, which approximately covers the pupil, and a peripheral zone 104 that sits over the iris. The peripheral zone 104 provides mechanical functions, including increasing the size of the lens thereby making the lens 101 easier to handle, providing ballasting to prevent rotation of the lens 101, and providing a shaped region that improves comfort for the lens 101 wearer. The optic zone 102 provides the optical functionality of the lens 101, and the optic zone comprises an annular region 103 and a central region 105. The lens 101 has a base radial curvature power, which is equal to the base radial sagittal power. The base power results from a radius of curvature of a surface of the lens 101. The centre of curvature of the central region 105 lies on a first optical axis 119 (shown in FIG. 6A). The annular region 103 has a greater radial curvature power than the base radial curvature power. The annular region 103 radial curvature power is provided by a radius of curvature of the annular region 103, which is smaller than the radius of curvature of the central region 105. However, in contrast to the lens 1 of FIGS. 1A and 1B, for the lens shown in FIGS. 5A and 5B, the curvature of the annular region 103 cannot be defined by a single sphere, and a centre of curvature of the annular region 103 does not lie on the first optical axis 119. This is shown in FIG. 6D. The annular region 103 is tilted relatively to the central region 105, so that the outer edge of the annular region 103 is higher (in FIG. 5B) relative to its inner edge than is the case in the lens of FIGS. 1A and 1B, which alters the radial sagittal power of the annular region 103, but does not alter the radial curvature power of the annular region 103. As shown in FIG. 6D, the anterior surface of the central region 105 defines a portion of a surface of a sphere of larger radius 107. The anterior surface of the annular region 103 defines a curved annular surface with smaller radius 106.

At the distal focal surface 117, light rays passing through the central region 105 are focused. The annular region 103 acts as an optical beam stop, which leads to a small spot size 124 of light at the distal focal surface 117, as shown in FIG. 6C.

A single image is not formed at the proximal focal surface 113. As shown in FIG. 6B, at the proximal focal surface 113, for a point source at infinity, light rays passing through the central region 105 generate a blur circle 128, as does the lens of FIGS. 1A-2B. However, light rays from a distant point source passing through the annular region 103 generate a focused annulus 122, as shown in FIG. 6B, which surrounds the blur circle 128. FIG. 6B shows the light pattern generated for a distant point source. In contrast to the lens 1 of FIGS. 1A and 1B, the lens 101 of FIGS. 5A and 5B does not generate a single image or an on-axis image at the proximal focal surface 113 that could be used to avoid the need for the eye to accommodate for near objects. For an extended object at distance, the focused image formed at the proximal focal surface 113 is a convolution of (i) the focused image of the extended object that would be obtained with a conventional lens having the optical power of the annular region 103 and (ii) an optical transfer function representing the optical effect of the annular region 103.

In contrast to the lens of FIGS. 1A and 1, an annulus or 'halo' effect does not occur at the distal focal surface 117.

Figure 7A:
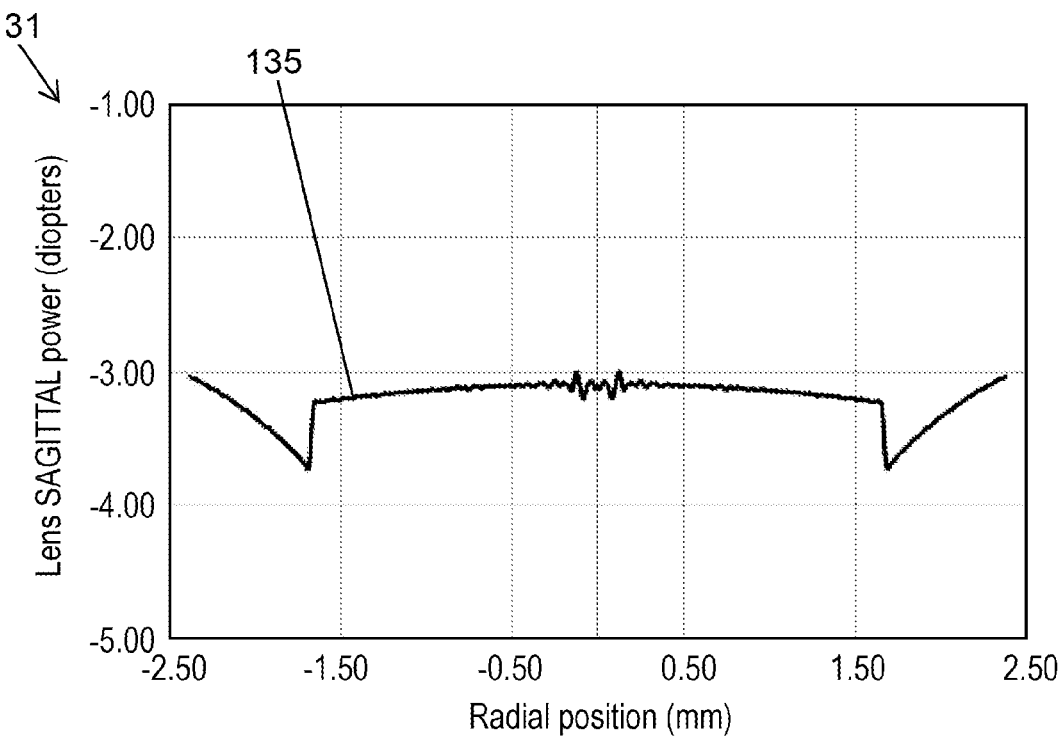
FIG. 7A is a plot showing the variation in radial sagittal power for the lens shown in FIGS. 5A and 5B.
Figure 7B:
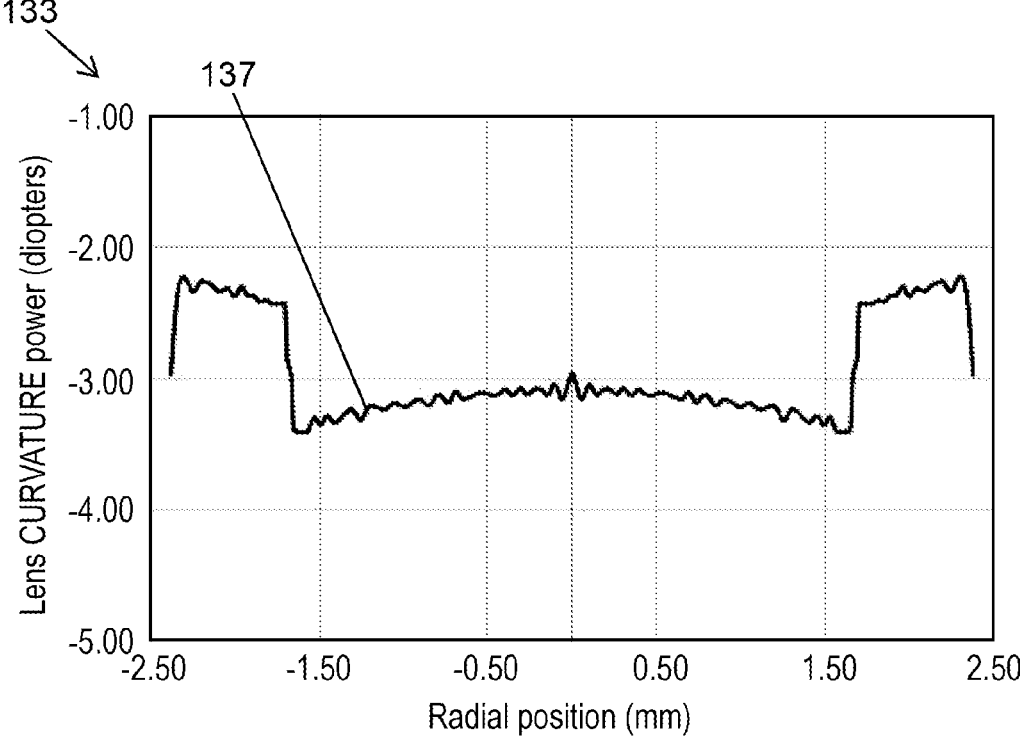
FIG. 7B is a plot showing the variation in radial curvature power for the lens shown in FIGS. 5A and 5B.

FIG. 7A is a plot 131 showing the variation in radial sagittal power for the lens 101 shown in FIGS. 5A and 5B, and FIG. 7B is a plot 133 showing the variation in radial curvature-based power for the lens shown in FIGS. 5A and 5B. FIGS. 5A and 5B show power variations along a radial diameter of the lens 101. For this lens 101, as the annular region 103 has a greater power than the central region, and this means that the radial curvature power (indicated by curve 137) is greater across the annular region 103 than across the central region 105. However, the annular region 103 is tilted relative to the central region 105, such that the annular region 103 has an off-axis centre of curvature. The tilt of the annular region 103 relative to the central region 105 means that in the radial sagittal power is more negative than the radial sagittal power of the central region 105 at the boundary between the central region 105 and the annular region 103, as shown by the curve 135. The radial sagittal power may increase with increasing radial distance towards the outer edge of the annular region 103.

Figure 8A:
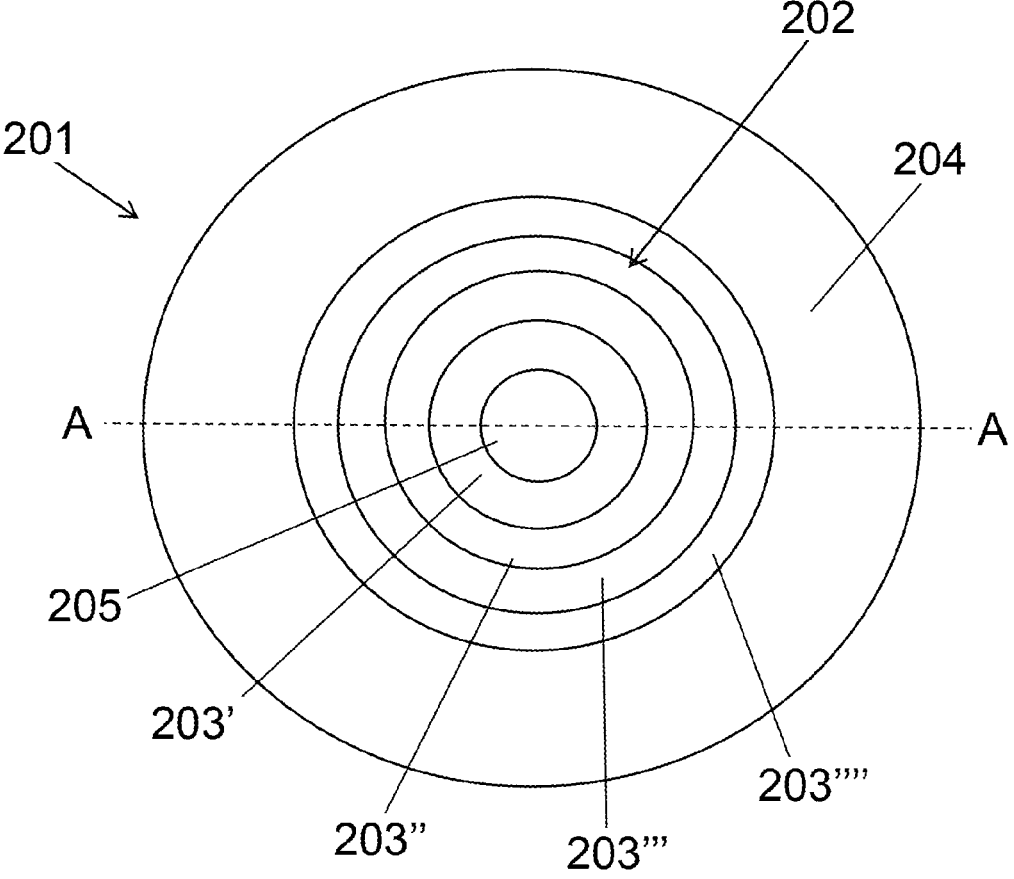
FIG. 8A is a top view of a lens according to an embodiment of the present disclosure.

FIG. 8A shows a schematic top view of a contact lens 201 according to an embodiment of the present disclosure. Similarly to the lens 1 of FIGS. 1A and 1B, and the lens 101 of FIGS. 5A and 5B, the lens 201 comprises an optic zone 202, which approximately covers the pupil, and a peripheral zone 204 that sits over the iris. The peripheral zone 204 provides mechanical functions, including increasing the size of the lens 201 thereby making the lens 201 easier to handle, providing ballasting to prevent rotation of the lens 201, and providing a shaped region that improves comfort for the lens 201 wearer. The optic zone 202 provides the optical functionality of the lens 201. The optic zone 202 comprises a central region 205 and a series of concentric annular regions 203', 203", 203''', 203"".

Figure 8B:
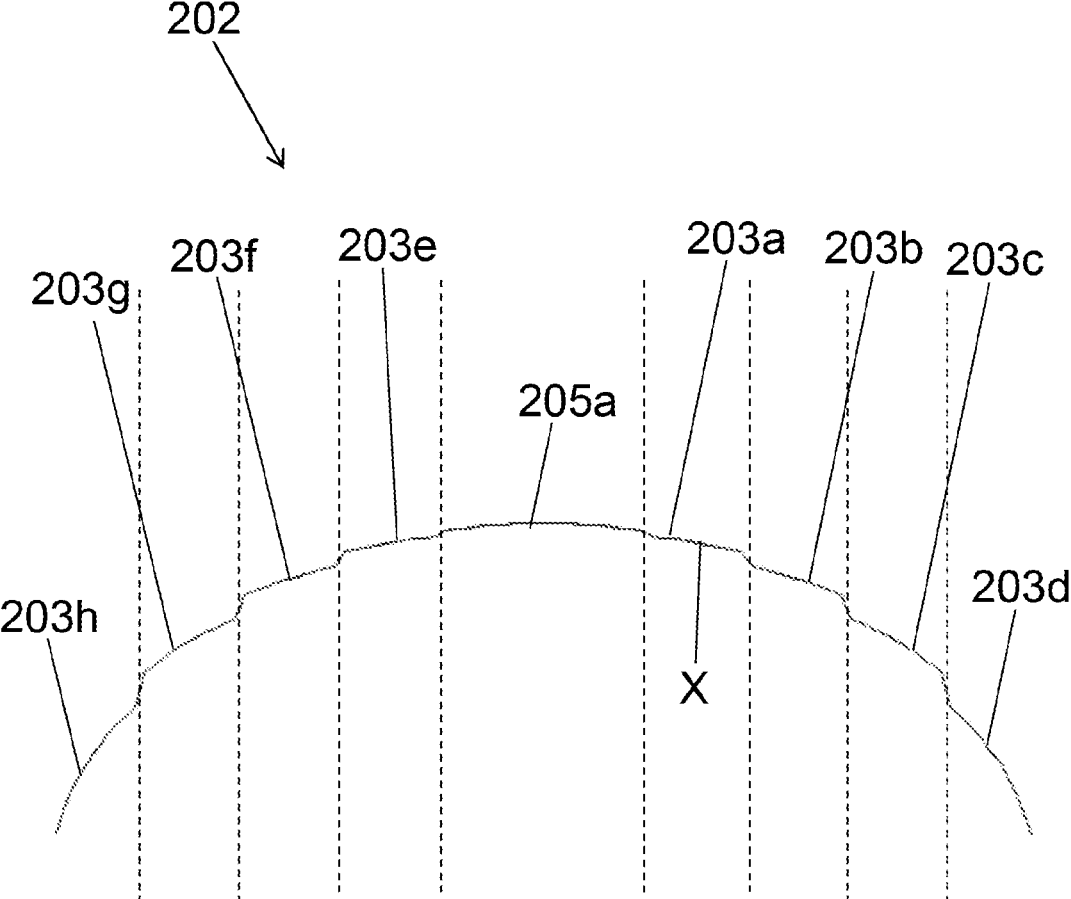
FIG. 8B is a cross-sectional slice along the meridian A-A, passing through the optic zone of the lens of FIG. 8A.

FIG. 8B shows a cross-sectional slice taken through the optic zone 202 of the lens 201 shown in FIG. 8A, along the line A-A. In 2D, the cross-sectional slice through the optic zone 202 shows a central arc 205a, which spans the central region 205. The central arc 205a has a radial curvature profile that provides the base radial curvature power. The curvature is constant along the length of the central arc 205a. A series of successive arcs 203a-h extend radially outwardly from the central region 205 in a symmetrical manner. Each arc 203a-h, has a constant radial curvature profile along its length, but the radial curvature of successive arcs increasing moving outwardly from the centre arc 205a, such that the innermost arcs 203a, 203e have larger radii of curvature, and hence smaller radial curvature powers, than the outermost arcs 203h, 203d. The radial curvature power of the optic zone 202 therefore increases moving outwardly from the central region 205 of the lens 201. The radial curvature power profile shows stepwise increases at the join between each arc 203a-h.

Each arc 203a-h is tilted about a point halfway along its length, indicated by letter X for the arc 203a. Tilting each arch 230a-h about its midpoint reduces the radial sagittal power along the length of the arc 203a-h, but does not change the radial curvature power along the length of the arc 203a-h.

For the lens shown in FIG. 8A, a cross-sectional slice taken along any meridian produces the same curvature profile. Thus, considering the optic region 202 in 3D, the optic region comprises a central region 205, spanned by the central arc 205a, and a series of concentric annular regions 203', 203", 203"', 203"" formed from the successive arcs 203a-h extending radially outwardly from the central region 205. For the lens shown in FIGS. 8A and 8B each arc 230a-h is the same length. The concentric annular regions 203', 203", 203"' and 203"" are circular in shape and have substantially the same radial widths.

Figure 9:
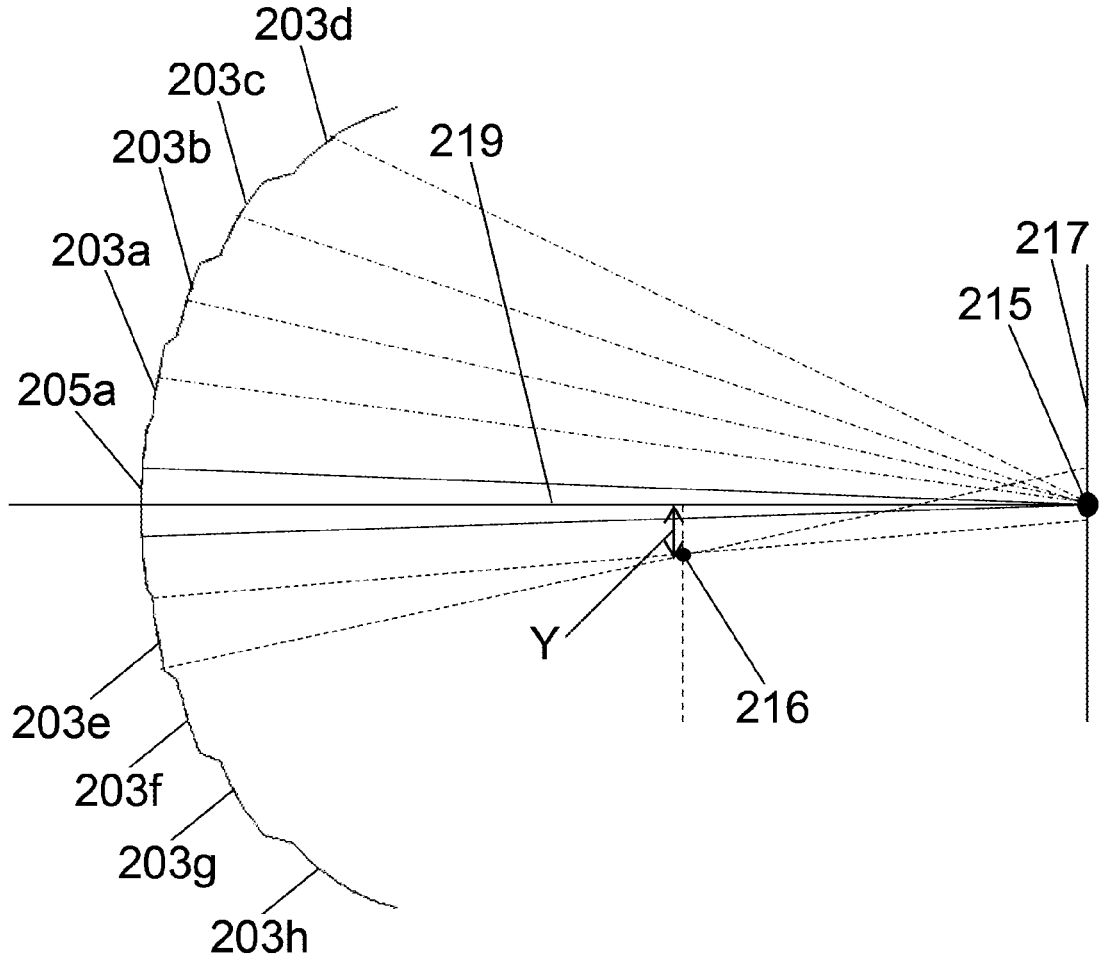
FIG. 9 is a partial ray diagram for the lens of FIG. 8A showing the focal points for light rays passing through the central region and the concentric annular regions.

FIG. 9 shows a partial ray diagram for the lens 201 of FIGS. 8A and 8B. Light rays from a distant point source passing through the central region 205 (represented by the central arc 205a) converge towards a spot 215 on the optical axis 219 at a distal focal surface 217. Light rays (dot-dash lines) from a distant point source passing through the centre of each arc 203a-h converge towards the same spot 215 on the optical axis 219 at the distal focal surface 217. For a given arc 203e, light rays (dashed lines) from a distant point passing through that arc converge towards a point 216 that is a first distance (indicated by letter Y) from the optical axis 219, at a focal surface that is in front of (or closer to the lens) than the distal focal surface 217.

Figure 10:
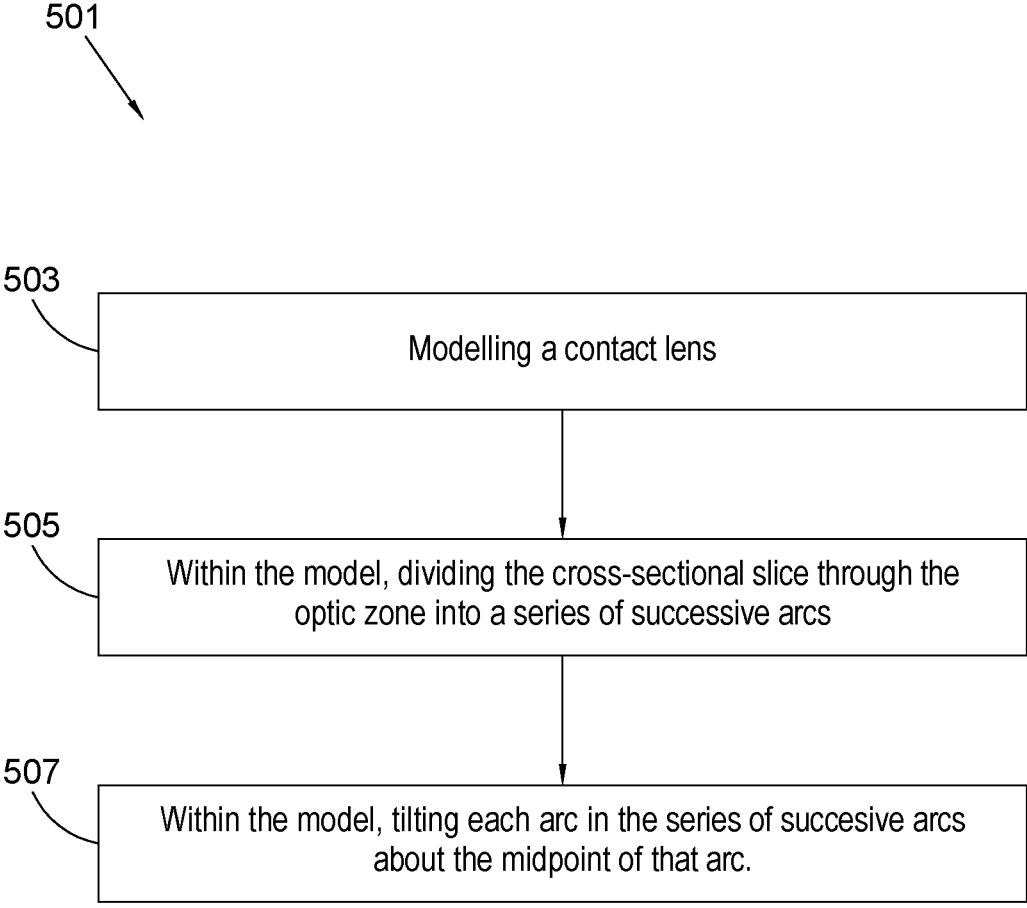
FIG. 10 is a flowchart showing a method of designing a contact lens according to an embodiment of the present disclosure.

FIG. 10 shows a method 501 of designing a contact lens, wherein the lens is a lens according to an embodiment of the present disclosure. In a first step 503, the method comprising modelling a contact lens. The lens includes an optic zone centred on an optical axis, and a peripheral zone surrounding the optic zone. A cross sectional slice through the optic zone taken along a meridian has a radial curvature power profile that increases with radial distance from the optical axis. In a second step 505, the method comprises, within the model, dividing the cross-sectional slice through the optic zone into a series of successive arcs extending radially outwardly from a central arc that is centred on the optical axis. In a third step 507, the method comprises, within the model, tilting each arc in the series of successive arcs about the midpoint of that arc, such that light rays from a distant point source passing through the midpoint of each arc converge towards a point on the optical axis, and wherein for each arc, light rays passing through that arc converge towards a point that is a first distance from the optical axis.

Figure 11A:
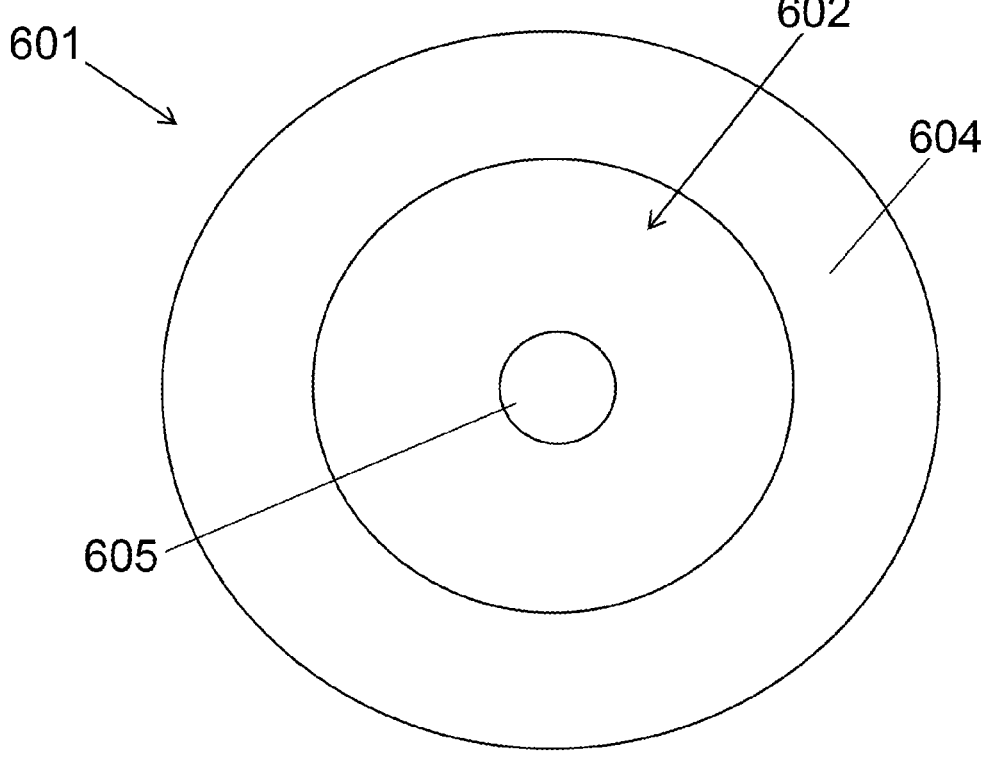
FIG. 11A is a schematic top view of a contact lens modelled in the first step of a method of designing a contact lens according to an embodiment of the present disclosure.
Figure 11B:
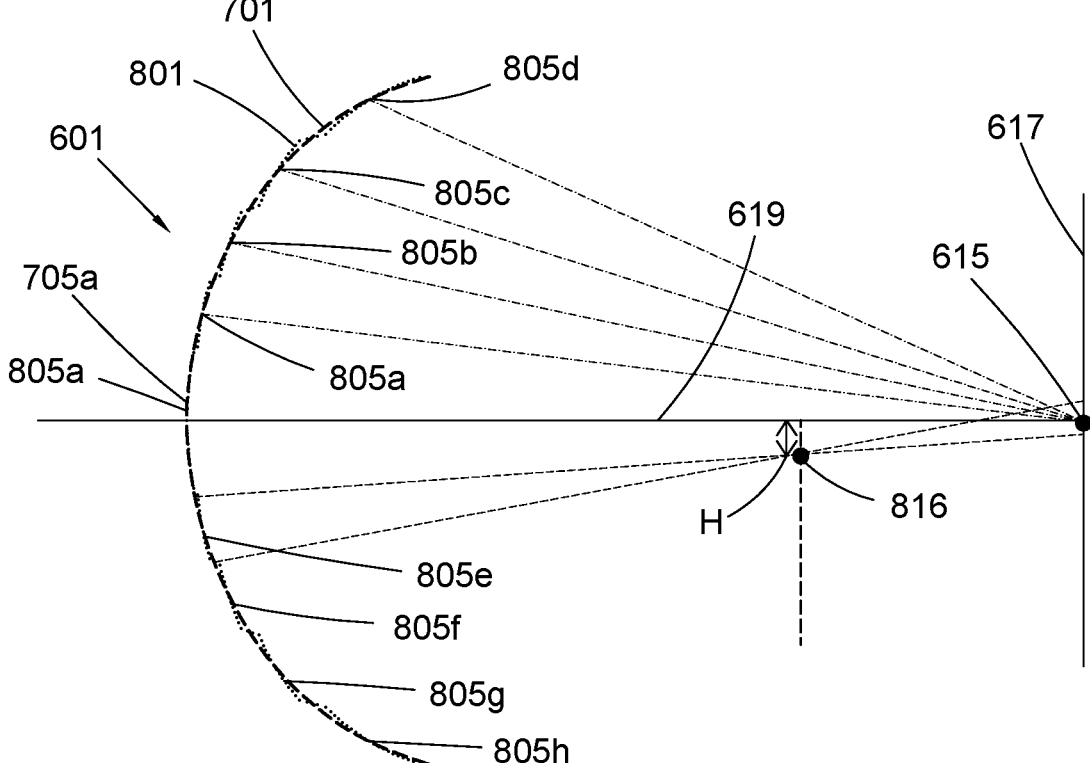
FIG. 11B is a cross-sectional slice along a meridian view of a contact lens modelled using a method of designing a contact lens according to an embodiment of the present disclosure.
Figure 11C:
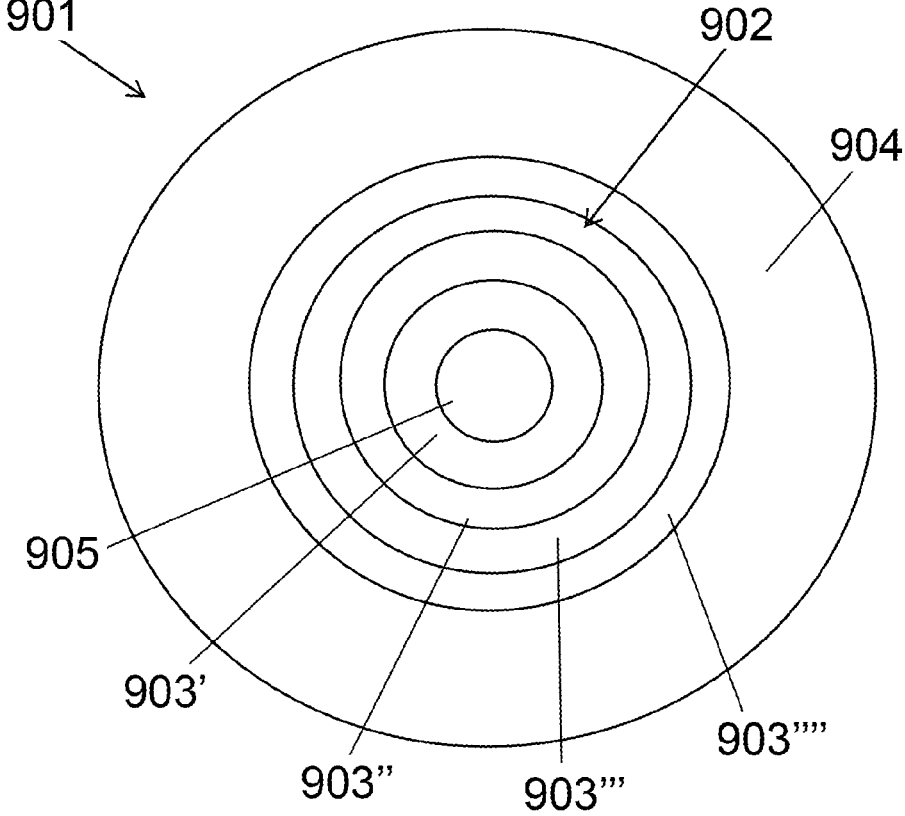
FIG. 11C is a schematic top view of a final resulting contact lens modelled using a method of designing a contact lens according to an embodiment of the present disclosure.

FIGS. 11A to 11C show an example of a lens 601 modelled using the method 501 described in FIG. 10. In the first step 503, a lens 601, shown in FIG. 11A is modelled. The lens 601 includes an optic zone 602 centred on an optical axis 619, and a peripheral zone 604 surrounding the optic zone 602. The optic zone 602 has a central region 605 that is centred on the optical axis. Light from a distant point source passing through the central region 605 will converge towards a point 615 on the optical axis at a distal focal surface 617. FIG. 11B shows a cross-sectional slice through the optic zone 602, taken along a meridian, with the dashed curve 701 showing the radial curvature profile of the lens 601 that is modelled in the first step 503. A central arc 705a spans a central region 605 of the lens. The radial curvature power profile of the lens 601 increases with radial distance from the optical axis 619. In a second step 505, within the model, the cross-sectional slice through the lens 601 is divided into a series of successive arcs, and in a third step 507, within the model, each arc in the series of successive arcs is tilted about the midpoint of that arc. This produces the red curve 801 shown in FIG. 11B, which includes a central arc 805a that is unchanged from the central arc 705a of the lens modelled in the first step, and a successive series of tilted arcs 805a-h. Tilting the arcs 805a-h does not change the radial curvature power of the arcs 805a-h, and therefore light rays (indicated as dot-dash lines) from a distant point source that pass through the midpoint of each arc 805a-h will converge towards a point on the optical axis 619 at a distal focal surface 617. Tilting the arcs 805a-h reduces the radial sagittal power of the arcs 805a-h, and therefore for each arc 805a-h, light rays (shown as dotted lines) passing through that arc 805a converge towards a point 816 that is a first distance (indicated by letter H) from the optical axis 619. FIG. 11C shows a schematic top view of a lens 901 designed based on the dotted curve 801. The lens 901 comprises an optic zone 902, which approximately covers the pupil, and a peripheral zone 904 that sits over the iris. The optic zone 902 provides the optical functionality of the lens 901. The optic zone 902 comprises a central region 905 and a series of concentric annular regions 903', 903", 903"', 903"" that have the radial curvature of the curve 801 shown in FIG. 11B.

It will be appreciated by those of ordinary skill in the art that features of these example embodiments may be combined in other embodiments that fall within the scope of the present disclosure.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A contact lens, the lens including an optic zone centred on an optical axis, and a peripheral zone surrounding the optic zone, wherein a cross-sectional slice through the optic zone taken along a meridian comprises a series of successive arcs comprising at least 10 arcs extending radially outwardly from the optical axis, and having a radial curvature power profile that increases monotonically with radial distance from the optical axis, wherein light rays from a distant point source passing through the midpoint of each arc converge towards a point on the first optical axis, and wherein for each arc, light rays from a distant point source passing through that arc converge towards a point that is a first distance from the optical axis.

2. The contact lens according to claim 1, wherein each arc in the series of successive arcs has a constant curvature within the arc.

3. The contact lens according to claim 1, wherein each arc in the series of successive arcs has a curvature within the arc that increases with radial distance from the centre of the lens.

4. The contact lens according to claim 1, wherein the series of successive arcs comprises a symmetric series of arcs centred on the optical axis.

5. The contact lens according to claim 1, wherein a cross-sectional slice taken along any meridian of the optical zone has substantially the same radial curvature profile.

6. The contact lens according to claim 1, wherein a cross-sectional slice taken along any meridian of the optical zone has substantially the same radial sagittal power profile.

7. The contact lens according to claim 1, wherein the circumferential curvature power profile of the optic zone varies with meridian around the lens.

8. The contact lens according to claim 1, wherein the sagittal power profile of the optic zone varies with meridian around the lens.

9. The contact lens according to claim 1, wherein at the centre of the optic zone, the lens has a base power of between −0.25 D and −15.0 D.

10. The contact lens according to claim 1, wherein the series of arcs have a curvature that provides an add-power of between +0.5 D and +20.0 D.

11. The contact lens according to claim 1, wherein the optic zone has a curvature power that results from the curvature of an anterior surface and/or a posterior surface of the lens.

12. The contact lens according to claim 1, wherein the lens comprises an elastomer material, a silicone elastomer material, a hydrogel material, or a silicone hydrogel material, or mixtures thereof.

13. A method of manufacturing a contact lens, the method comprising:

forming a contact lens according to claim 1.

14. A method of designing a contact lens, the method comprising:

modelling a contact lens, the lens including an optic zone centred on an optical axis, and a peripheral zone surrounding the optic zone, wherein a cross-sectional slice through the optic zone taken along a meridian has a radial curvature power profile that increases monotonically with radial distance from the optical axis;

within the model, dividing the cross-sectional slice through the optic zone into a series of successive arcs comprising at least 10 arcs extending radially outwardly from the optical axis, and extending radially outwardly from a central arc that is centred on the optical axis;

within the model, tilting each arc in the series of successive arcs about the midpoint of that arc, such that light rays from a distant point source passing through the midpoint of each arc converge towards a point on the optical axis, and wherein for each arc, light rays passing through that arc converge towards a point that is a first distance from the optical axis; and designing a lens based on the modelled lens.

15. A contact lens, the lens including an optic zone centred on an optical axis, and a peripheral zone surrounding the optic zone, wherein the optic zone comprises a series of contiguous rings comprising at least 10 rings extending radially outwardly from the optical axis, and having a radial curvature power profile that increases monotonically with radial distance from the optical axis, wherein light rays from a distant point source passing through the midpoint of the width of each ring converge towards a point on the first optical axis, and wherein for each ring, light rays from a distant point source passing through that ring converge towards a point that is a first distance from the optical axis.

* * * * *